United States Patent [19]

Kito et al.

[11] Patent Number: 5,309,744

[45] Date of Patent: May 10, 1994

[54] LOCKING APPARATUS FOR SHIFT LEVER OF AUTOMATIC TRANSMISSION

[75] Inventors: Shozo Kito; Shoichi Harada; Minoru Morikawa, all of Aichi, Japan

[73] Assignee: Kabushiki Kaisha Tokai-Rika-Denki-Seisakusho, Japan

[21] Appl. No.: 946,165

[22] Filed: Sep. 17, 1992

Related U.S. Application Data

[63] Continuation of Ser. No. 565,244, Aug. 10, 1990, abandoned.

[51] Int. Cl.[5] .............................................. B60R 25/06
[52] U.S. Cl. ......................................... 70/247; 70/248; 192/4 A; 74/483 R
[58] Field of Search .................. 70/247, 248; 180/271; 192/4 A; 74/483 R

[56] References Cited

U.S. PATENT DOCUMENTS

| | | | |
|---|---|---|---|
| 3,583,184 | 6/1971 | Papale | 70/247 X |
| 3,602,018 | 8/1971 | Eisenman | 70/247 X |
| 4,235,123 | 11/1980 | Simancik et al. | 70/247 X |
| 4,905,802 | 3/1990 | Gotoh | 70/247 X |
| 4,909,096 | 3/1990 | Kobayashi | 192/4 A X |
| 4,934,496 | 6/1990 | Barske et al. | 74/483 R X |
| 4,936,158 | 6/1990 | Livshits et al. | 70/248 X |
| 4,938,042 | 7/1990 | Muramatsu | 70/247 X |
| 4,947,967 | 8/1990 | Kito et al. | 192/4 A |
| 5,003,799 | 4/1991 | Imai et al. | 70/247 |
| 5,025,901 | 6/1991 | Kito et al. | 74/483 R X |
| 5,027,929 | 7/1991 | Ratke et al. | 70/248 |
| 5,036,962 | 8/1991 | Amagasa | 70/248 X |

FOREIGN PATENT DOCUMENTS

| | | |
|---|---|---|
| 1132427 | 3/1983 | Japan . |
| 59-176253 | 5/1983 | Japan . |
| 6020448 | 7/1983 | Japan . |
| 61-168412 | 4/1985 | Japan . |
| 62-202433 | 6/1986 | Japan . |

*Primary Examiner*—Peter M. Cuomo
*Assistant Examiner*—Suzanne L. Dino
*Attorney, Agent, or Firm*—Sixbey, Friedman, Leedom & Ferguson

[57] ABSTRACT

The present invention is directed to a shift locking apparatus for blocking a shifting movement unless a special operation is conducted such as the depression of a foot brake by an operator, when a shift lever of an automatic transmission is moved from a specified shift position of a parking "P" and the like to another shift position, wherein when releasing of the shift lock is conducted by an electrically operated actuator such as a solenoid, the shift lock can be released by use of a key for a vehicle even in a condition where the electrically operated actuator is not used. The operation of a key cylinder by use of the key of the vehicle by the operator causes the shift lock to be released, ensuring that the operator can move the shift lever to any other shift position, thereby permitting the vehicle to be moved even if there is some trouble such as electrical trouble.

4 Claims, 22 Drawing Sheets

LOCKING APPARATUS FOR SHIFT LEVER OF AUTOMATIC TRANSMISSION

This application is a continuation of Ser. No. 07/565,244, filed Aug. 10, 1990, now abandoned.

BACKGROUND OF THE INVENTION

1. Field of the Invention

The present invention relates to a locking apparatus for a shift lever of an automatic transmission, and particularly, to a locking apparatus for a shift lever of an automatic transmission, in which the locking of the shift lever can be released manually.

2. Description of the Related Art

The shift lever of the automatic transmission is of a construction in which the shift lever is brought out of engagement with a detent plate by the movement in the shift lever axial direction of a detent pin mounted on the shift lever, thereby permitting a shifting operation. A known shift lever locking apparatus in which the shift lever can be operated only under a specific condition such as during a braking operation or the like including one in which the detent pin is restrained by a solenoid (see Japanese Utility Model Application Laid open No. 176253/84). In such a shift lever locking apparatus, when the shift lever is in a parking range (P range), engagement of the detent pin with a plunger of the solenoid causes the shifting movement of the shift lever to be restrained, while enabling the withdrawal of a key from an ignition key-insertion cylinder. Therefore, in a state in which the key has been withdrawn from the cylinder (i.e., in an engine-stopped state), the movement of the detent pin is prevented by the solenoid, and the shift lever is fixed in the P range. If an ignition switch is in an "on" position, the solenoid is excited, so that the solenoid plunger is pulled into the solenoid to permit the movement of the detent pin, thereby ensuring that the shift lever can be freely shifted.

Apart from such an apparatus, there is also known a locking apparatus for a shift lever, which is designed so that the solenoid is energized when a braking operation is conducted.

In this locking apparatus for a shift lever of an automatic transmission, the provision of a manual releasing member for forcibly moving the solenoid plunger manually to release the restraint of the shift lever ensures that the vehicle can be moved even when there is trouble with the electrical system of a vehicle or when the vehicle is being repaired under a condition where the power source has been disconnected. However, it is desirable that the manual releasing member cannot be operated except when necessary.

SUMMARY OF THE INVENTION

With the above circumstances in view, it is an object of the present invention to provide a locking apparatus for a shift lever of an automatic transmission, in which locking of the shift lever can be manually released, but can be prevented from being inadvertently released.

According to the present invention, a shift lock releasing means is provided, so that retaining of the detent pin in its locked position by an electrically operated actuator can be released by operating a key by an operator. More specifically, the electrically operated actuator ensures that the shift lever is released from the shift lock by a special operation such as the depression of a foot brake by the operator and moved from a specified shift position such as the P range to another shift position. However, when the electrically operated actuator cannot be operated for some reason, the shift lock can be released by operating the shift lock releasing means by use of a key of a vehicle by the operator. Therefore, when the key for the vehicle is not used, the shift lock cannot be released and as necessary, the shift lock can be released to permit the movement of the vehicle even in an electrical trouble or in a repair of the vehicle. The shift lock releasing means may be designed to directly release the shift lock by the operation of the key, or a manual operating means may be separately provided so that it can be operated by the operation of the key, thereby releasing the shift lock.

DESCRIPTION OF THE PREFERRED EMBODIMENTS

A first embodiment of the present invention will now be described with reference to FIGS. 1 to 4.

Figure 1:
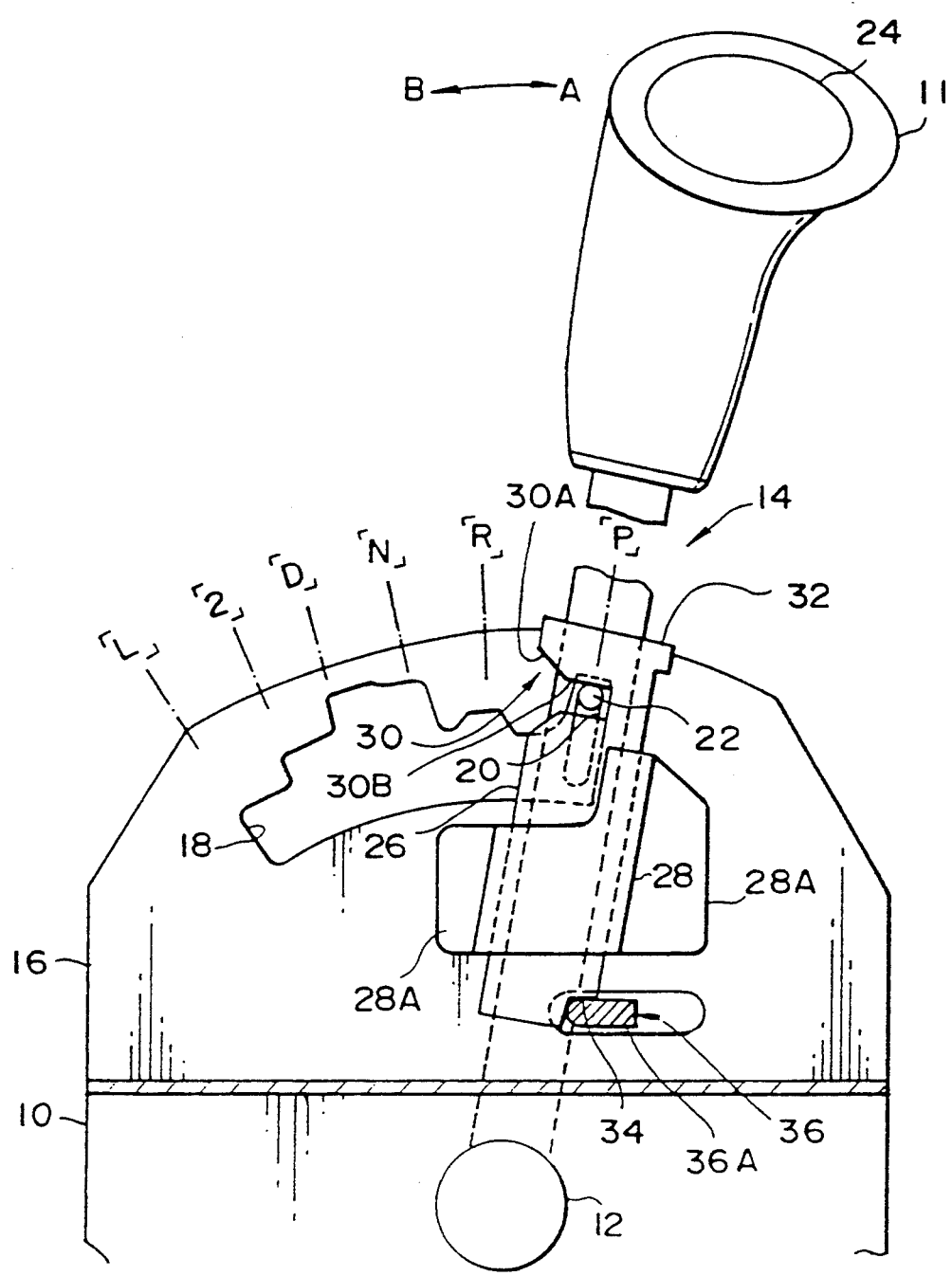
FIG. 1 is a partial sectional side view of a shift lever of an automatic transmission to which the present invention is applied.

A base plate 10 shown in FIG. 1 is secured to a vehicle body which is not shown. A shift lever 14 is rotatably supported to the base plate 10 via a cylindrical retainer 12 secured to a lower portion thereof. The shift lever 14 is shiftable about the retainer 12 in substantially left and right directions as viewed in FIG. 1 (in directions A and B indicated by an arrow) by an operation of a shift knob 11 mounted on an upper end of the shift lever 14.

A detent plate 16 is risingly mounted on an upper end of the base plate 10 with its direction of thickness being in an axial direction of the retainer 12 and is provided with a detent hole 18. A detent pin 22 is disposed on the shift lever 14 to project from an elongated hole 20 in a direction substantially perpendicular to the shift lever 14 and passes through the detent hole 18.

The detent pin 22 is vertically movable in an axial direction of the shift lever 14 in such a manner that it is guided in the elongated hole 20. The detent pin 22 is urged upwardly by an urging means (not shown) provided in the shift lever 14. The detent pin 22 is connected to a detent releasing button 24 disposed on the shift knob 11, via a rod (not shown) mounted in the shift lever 14, so that it may be moved downward (i.e., toward the retainer 12) against the urging force of the urging means (not shown) by pressing the detent releasing button 24.

Figure 4:
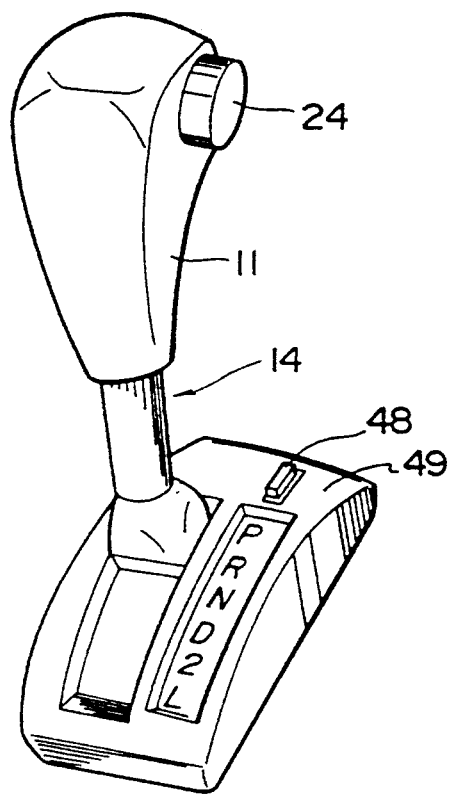
FIG. 4 is a perspective view illustrating an external appearance of the shift lever locking apparatus according to the first embodiment.

The detent hole 18 has an upper, inner peripheral wall in a rugged shape which is associated with "P", "R", "N", "D", "2" and "L" shift positions shown in FIG. 4. This permits the limitation of the movement of the detent pin 22 in the direction A or B.

In other words, shift operation positions are provided such that the shift lever 14 cannot be moved in the direction A or B until the detent pin 22 is moved downward by pressing the detent releasing button 24. For example, in the "P" shift position, the detent pin 22 is located in a deep groove portion of the detent hole 18, so that shifting to the "R" shift position cannot be achieved without the above operation.

A lock plate 26 is disposed on the detent plate 16 on side opposite from the shift lever 14, i.e., on the side at where a leading end of the detent pin 22 projects from the detent hole 18. The lock plate 26 is vertically movable in the axial direction of the shift lever 14 located in the "P" shift position in such a manner that it is guided by a guide plate 28 secured at its opposite ends 28A to the detent plate 16. Formed at the upper end of the lock plate 26 is a notch 30 which is opened toward the "R" shift position on a left side as viewed in FIG. 1. The notch 30 has a widely opened tapered inlet 30A, so that if the shift lever 14 is moved from the "R" shift position to the "P" shift position, the detent pin 22 enters the notch 30 and on to its portion 30B deeper than the inlet 30A.

In addition, the lock plate 26 has a stopper 32 provided at its upper end which projects, as viewed in FIG. 1 in a rightward direction opposite from the "R" shift position. The stopper 32 abuts against an upper end of the guide plate 28 to define a downward moving limit for the lock plate 26.

With the lock plate 26 positioned at the downward moving limit, the inlet 30A of the notch 30 is overlapped with the detent hole 18 to permit the movement of the detent pin 22 toward the "R" shift position.

As viewed in FIG. 1, the lock plate 26 has a lower notch 34 formed at its lower end and in a right corner on side opposite from the shift position "R". A first end 36A of a lever plate 36 enters the lower notch 34, so that the lever plate 36 is engaged with the lock plate 26. In this state, the lock plate 26 cannot be lowered and hence, the detent pin 22 cannot be slipped out of the deeper groove portion in the "P" range in the detent hole 18.

Figure 2:
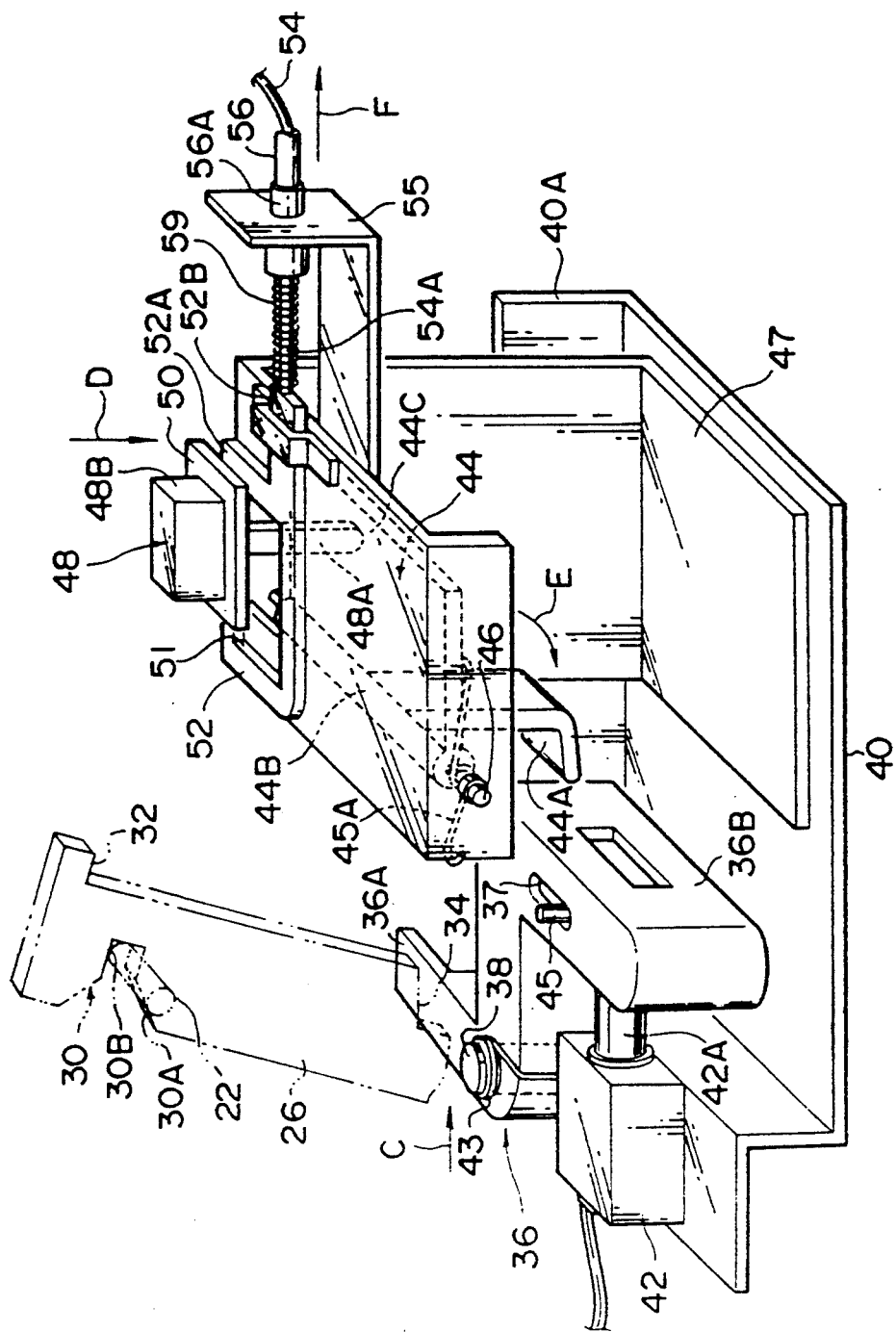
FIG. 2 is a schematic perspective view of a locking apparatus for the shift lever of the automatic transmission according to a first embodiment of the present invention.

As shown in FIG. 2, the lever plate 36 (with a second end 36B having an axis vertically disposed) is axially supported to a support pin 38 which is secured to an L-shaped bracket 40 with its bottom wall 40A attached to the base plate 10.

A solenoid 42 is mounted on the bracket 40, with a plunger 42A connected to the lever plate 36 via a pin 45 that is passed through an elongated hole 37 formed in the lever plate 36. During energizing of the solenoid 42, the plunger 42A is attracted thereinto, and during non-energization of the solenoid 42, the plunger 42A is pushed out of the solenoid 42 by an urging force of a return spring 43 which is a torsion coil spring coiled around the support pin 38. If the solenoid 42 is excited, the lever plate 36 is swung in a left direction as viewed in FIG. 2 (i.e., in a direction indicated an arrow C) by the attraction of the plunger 42A into the solenoid 42 against the urging force of the return spring 43.

In the swung state (in the direction of the arrow C as described above), the lever plate 36 assumes a position in which the first end 36A is separated from the lock plate 26.

The lock plate 26, the lever plate 36, the solenoid 42 and the return spring 43 and the like constitute a shift lock mechanism. When the "P" shift position is selected, the solenoid 42 is energized and excited by an electrical control, if a braking operation is conducted with the ignition being on.

A projection 44A of a release lever 44 serving as a portion of a manual releasing means is abutable against a surface of the lever plate 36 opposite from the solenoid 42. The release lever 44 is a plate bent into a substantially L-shape and has an intermediate bent portion 44B rotatably supported to a shaft 46. The bracket 47 is formed upright from the bracket 40. A torsion coil spring 45A is coiled around the shaft 46. The torsion coil spring 45A is fixedly engaged at one end to a bracket 47. The other end is fixedly engaged to the release lever 44, so that it provides an urging force in a direction to return the release lever 44 when the release lever 44 has been rotated in a clockwise direction (i.e., in a direction indicated by an arrow E).

A leg 48A of an operating member 48 serving as another portion of the manual releasing means disposed so as to move in a vertical direction of a vehicle abuts against an upper surface of an end 44C of the release lever 44 opposite from the lever plate 36. The operating member 48 is supported on the bracket 47 so as to move in the vertical directions only (i.e., in the direction indicated by an arrow D and in the opposite direction) and projects from a shift lever cover 49 for covering the mechanisms such as the detent plates, as sown in FIG. 4. The release lever 44 can be rotated in the direction indicated by the arrow E by pressing the operating member 48 downwardly as viewed in FIG. 2 (i.e., in the direction indicated by the arrow D).

A collar 50 is formed around an outer periphery of a lower portion of the operating member 48 below the head 48B thereof. A stopper 52 serving as a lock member is disposed below the collar 50 and on an upper surface of the bracket 47 for movement in leftward and rightward directions as viewed in FIG. 2 and is provided at its central portion with a through hole 51 for the collar 50. Therefore, when the collar 50 is not aligned with the through hole 51, the movement of the operating portion 48 in the direction of the arrow D is blocked by the stopper 52.

A pull cable 54 serving as a portion of a transmitting means is connected to the other end 52B of the stopper 52, so that the stopper 53 may be moved in a direction indicated by an arrow F by pulling the pull cable 54 in the rightward direction as viewed in FIG. 2.

The pull cable 54 is inserted into a tube 56 and is secured at one end 56A to an end of an L-shaped bracket 55 secured to the bracket 47. A compression coil spring 59 is coiled around the pull cable 54 between the one end 56A and the end 52B of the stopper 52, so that the stopper 52 is urged in the opposite direction of the arrow F.

Figure 3:
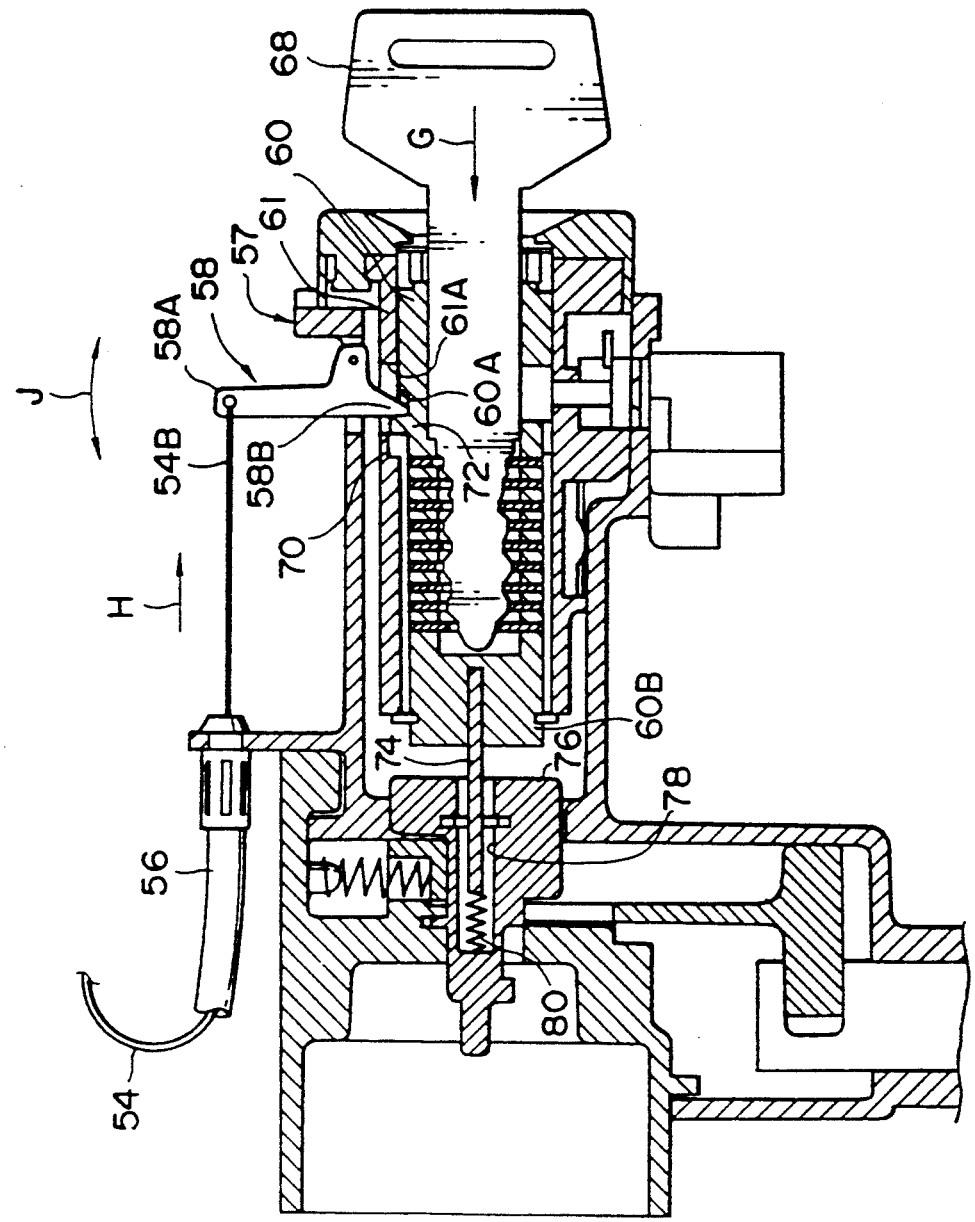
FIG. 3 is a sectional view of an ignition key to which the first embodiment is applied.

As shown in FIG. 3, the other end 54B of the pull cable 54 is connected to one end 58A of a cam 58 which serves as another portion of the transmitting means axially supported to on an ignition key shell 57 for rotation in substantially leftward and rightward directions (i.e., in directions indicated by an arrow J) as viewed in FIG. 3. The other end 58B of the cam 58 extends through a notch 61A provided in a cylindrical key cylinder 61 inserted in the ignition key shell 57 and is inserted into a groove 60A in a key rotor 60 which is axially and movably inserted into the key cylinder 61. The two grooves 60A are axially provided around an outer periphery of the key rotor 60 and stepped at their right ends as viewed in FIG. 3.

The key cylinder 61 has two grooves 70 axially provided around its inner periphery and each having one end connected to a notch 61A, and the key rotor 60 has a protrusion 72 axially formed around an outer periphery thereof. When the key rotor 60 is in either the "ACC" or "LOCK" the position, the protrusion 72 is inserted into the groove 70 in the key cylinder 61, if the key rotor 60 is axially moved.

When the key rotor 60 is in either the "ACC" or "LOCK" the position and pushed in the leftward direction (i.e., in the direction of an arrow G) as viewed in FIG. 3, the end 58B of the cam 58 abuts against the stepped portion of the groove 60A and moves integrally in the direction of the arrow G with the movement of the key rotor 60 in the direction of the arrow G, and the other end 58B is moved in the rightward direction (i.e., in a direction indicated by an arrow H) as viewed in FIG. 3, causing the pull cable 54 to be pulled in the direction indicated by the arrow F in FIG. 2.

A connecting member 74 is coupled at one end thereof to a leading end 60B of the key rotor 60 and inserted at the other end thereof into a hole 78 made in a steering locking cam 76. A compression coil spring 80 is inserted between a bottom portion of the hole 78 and the connecting member 74, so that when the key rotor 60 is moved in the direction indicated by the arrow G, an urging force of the compression coiled spring 80 acts on the key rotor 60.

The operation of this embodiment will be described below.

With a key 68 located in the "ACC" or "LOCK" position, the groove 70 provided around the outer periphery of the key rotor 60 is aligned with the protrusion 72 of the key cylinder 61, so that the key 68 can be pushed in the direction indicated by the arrow G. When the key rotor 60 is moved in the direction indicated by the arrow G against the urging force of the compression coil spring 80, the end 58B of the cam 58 is moved in the direction of the arrow G, while the other end 58A of the cam 58 is moved in the direction of the arrow H, causing the one end 58B of the pull cable 54 to be pulled in the direction of the arrow H.

The pulling of the one end 58B of the pull cable 54 results in the stopper 52 connected to the other end 58A of the pull cable 54 to be moved in the direction indicated by the arrow F in FIG. 2. This causes the through hole 51 formed in the stopper 52 to correspond with the collar 50 of the operating member 48, ensuring that the stopper 52 can be moved downward. When an operator presses the operating member 48 in the direction of the arrow D in this state, the release lever 44 is rotated in the direction of the arrow E. This causes the lever plate 36 to be rotated about the support pin 38 against the urging force of the return spring 43, so that the one end 36A of the lever plate 36 is disengaged from the lower notch 34 of the lock plate 26, thereby releasing the locking of the shift lever 14.

Therefore, pressing the detent button 24 enables the shifting of the shift lever 14. Thus, the shifting of the shift lever 14 is possible even during a repairing operation when a power source is disconnected.

When the key 68 being in an "ON" or "START" position (i.e., in an operation state of an engine), the groove 70 provided around the outer periphery of the key rotor 60 is not fitted over the projection 72 formed around the inner periphery of the key cylinder 61, so that the key 68 cannot be pushed in and hence, the locking of the shift lever cannot be released. For this reason, the pressing of the operating member 48 is impossible in the operation state of the engine and hence, the locking of the shift lever cannot be inadvertently released. Thereafter, if the operator depresses a foot brake, the solenoid 42 is excited, so that the shift lever 14 can be moved to a position other than the "P" range.

A second embodiment of the present invention will now be described with reference to FIG. 5.

The same components as in first embodiment are designated by the same reference numerals, and the description thereof is omitted.

Figure 5:
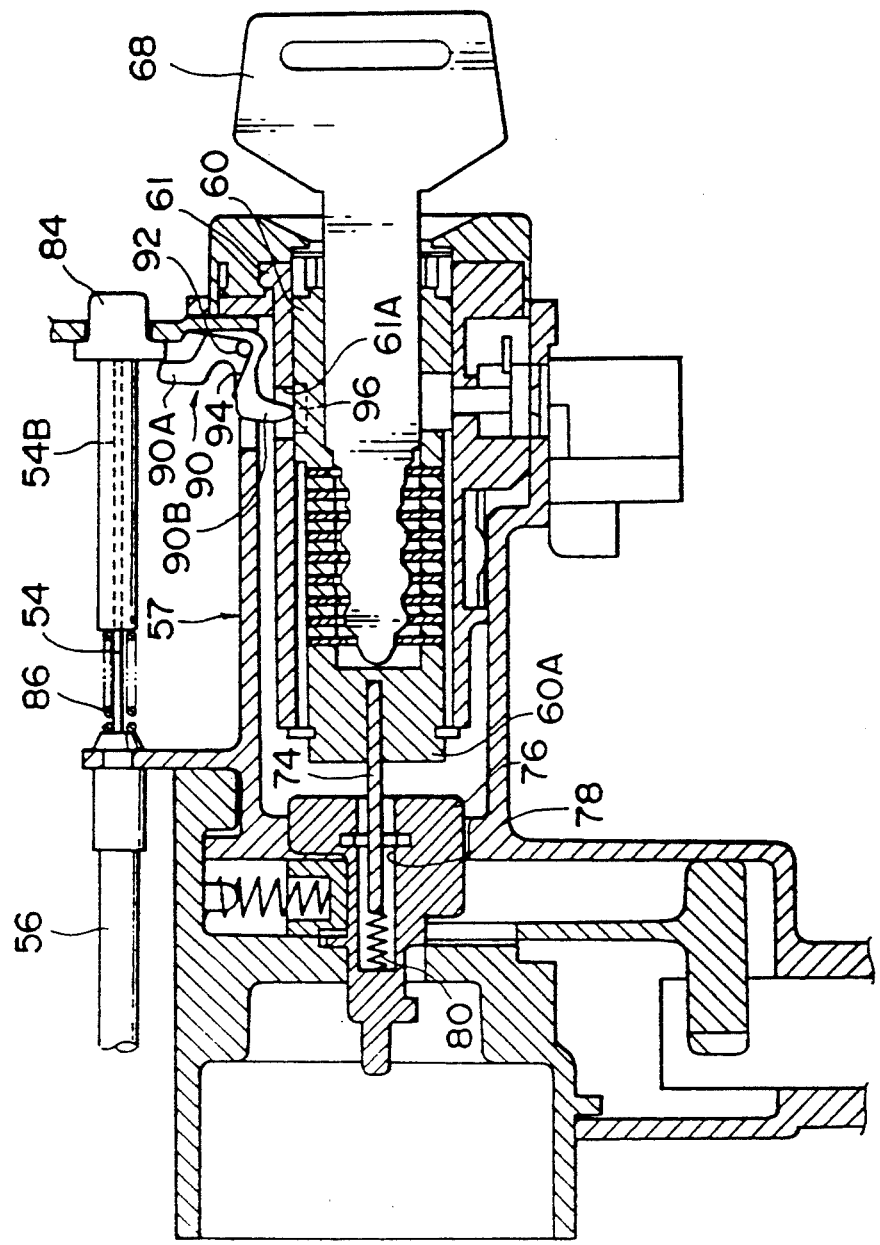
FIG. 5 is a sectional view of an ignition key when a second embodiment of the present invention is applied.
Figure 6:
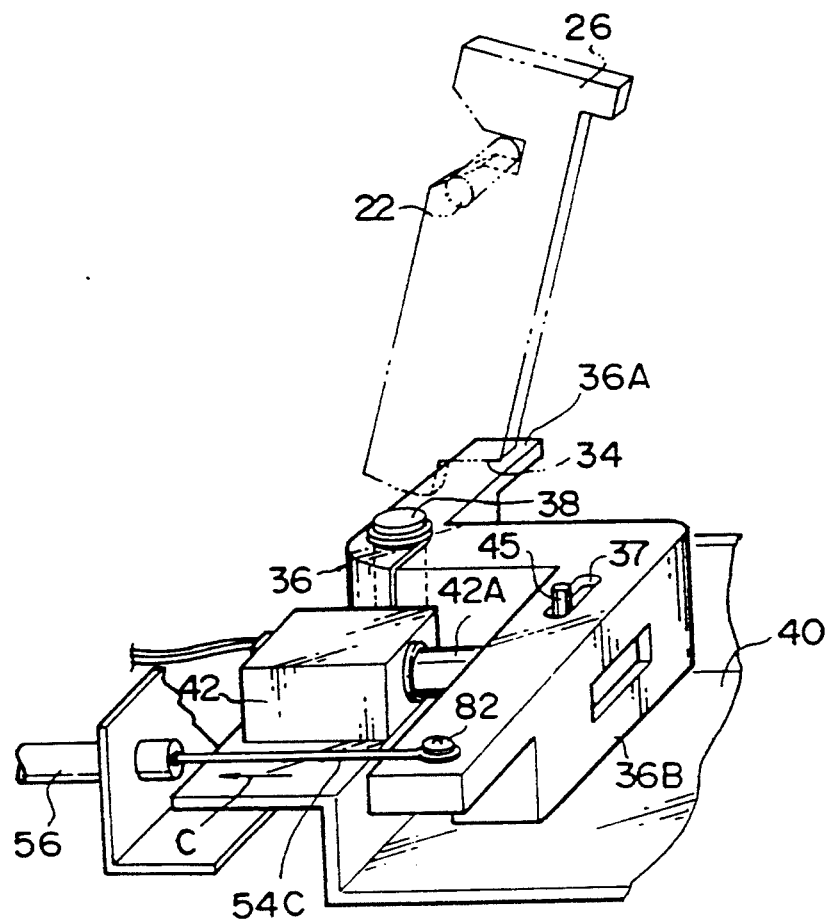
FIG. 6 is a perspective view illustrating essential portions of the shift lever locking apparatus according to the second embodiment of the present invention.

As shown in FIG. 5, an operating member 84 is disposed on an ignition key shell 57 and adapted to be operated by an operator. One end 54B of the pull cable 54 is connected to the operating member 84. As shown in FIG. 6, the other end 54C of the pull cable 54 is led from a left side as viewed in FIG. 6 and connected to the end 36A of the lever plate 36 by a machine screw 82. The operating member 84 is urged in a rightward direction in FIG. 5 a compression coil spring 86. A converter mechanism (which is not shown) is disposed at an intermediate portion of the pull cable 54 for converting an pressing force into a pulling force. Therefore, when the operating member 84 is pressed leftward as viewed in FIG. 5 against the urging force of the compression coil spring 86, the end 36A of the lever plate 36 is moved in a direction indicated by the arrow C to release the locking of the shift lever 14.

One end 90A of a stopper 90 abuts against a left side of the operating member 84 as viewed in FIG. 5, and the stopper 90 is rotatably supported to the ignition key shell 57 by a pin 92. A torsion coil spring 94 is coiled around the pin 92. The stopper 90 is urged by the torsion coil spring 94 so that the other end 90B of the stopper 90 extending through a notch 59A made in the key cylinder 61 abuts against the outer periphery of the key rotor 60.

The outer periphery of the key rotor 60 is provided with a groove 96 against which the end 90B of the stopper 90 abuts, when the key 68 is in a "LOCK" or "ACC" position. Therefore, when the key 68 is in the "LOCK" or "ACC" position, the stopper 90 is rotatable, and the operating member 84 can be pressed to release the lock of the shift lever 14.

In the above first and second embodiments, the construction is such that the stoppers 52, 90 are moved by the pressing operation of the key 68, thereby permitting the movement of the operating members 48, 84. When that apparatus does not include the operating members 48, 84, if the key 68 is pressed or rotated, the lever plate 36 may be directly rotated against the urging force of the return spring 43, and the shift lever 14 may be dislocked by an operation of the key 68 (see embodiments illustrated in FIG. 9 and subsequent Figures).

Figure 7:
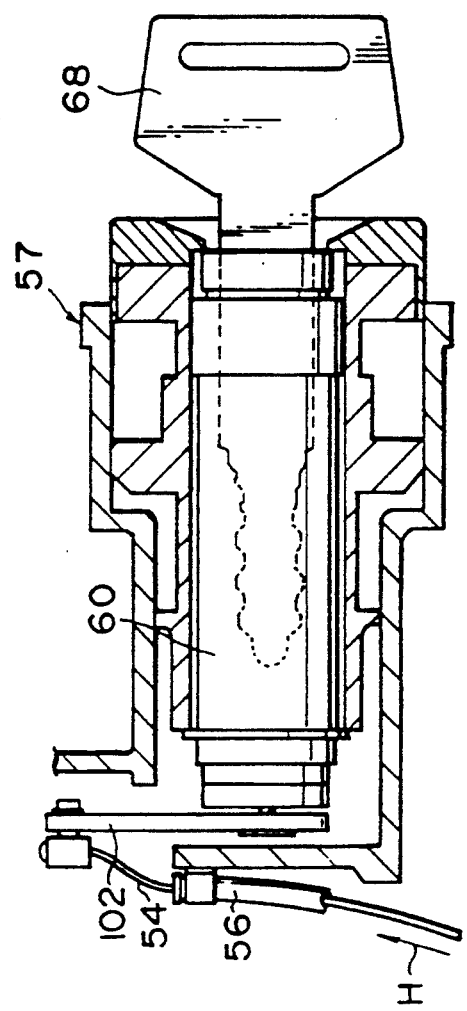
FIG. 7 is a partially sectional side view of an ignition key cylinder when a third embodiment of the present invention is applied.

A third embodiment of the present invention is shown in FIG. 7. This embodiment is a modification of FIG. 3 in the first embodiment.

More specifically, in the third embodiment, a lever 102 is coaxially secured to the key rotor 60 which is rotated by the key 68, and one end of the pull cable 54 is connected to a leading end of the lever 102.

The lever 102 is adapted to provide a sufficient pulling stroke to the pull cable 54 only when the key 68 has been rotated to the "LOCK" or "ACC" position. Therefore, the other end of the pull cable 54 is connected to the lever plate 36 (FIG. 6) as in the previous embodiment, and only when the key 68 has been rotated to the "LOCK" or "ACC" position, is the lever plate 36 separated from the lock plate 26 to permit the movement of the lock plate 26 in a lock releasing direction.

Figure 8:
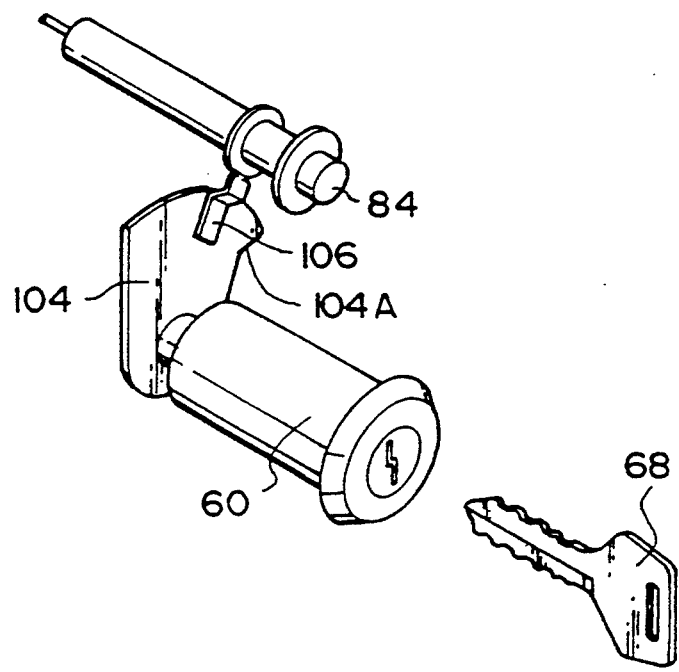
FIG. 8 is a perspective view illustrating an ignition key cylinder and associated portions when a fourth embodiment of the present invention is applied.

A fourth embodiment of the present invention is shown in FIG. 8. This embodiment is a modification of FIG. 5, wherein the operating member 84 can be pressed only when the key rotor 60 is in a specified rotational position. More specifically, a lever 104 is coaxially secured to the key rotor 60 and opposed a corresponding arm 106 is secured to the operating member 84. In accordance with the lever 104, the movement of the arm 106 in the pressing direction of the operating member 84 is limited. A notch 104A formed in the lever 104 is adapted to correspond with the arm 106 to permit the pressing of the operating member 84, when the key rotor 60 has been rotated to either the "LOCK" or "ACC" positions by the key 68.

Therefore, even in this embodiment, when the operator inserts the key 68 into the key rotor 60 and rotates it to a particular key operation position, i.e., a "LOCK" or "ACC" position, the operating member 84 can be pressed to release the shift locking.

Figure 9:
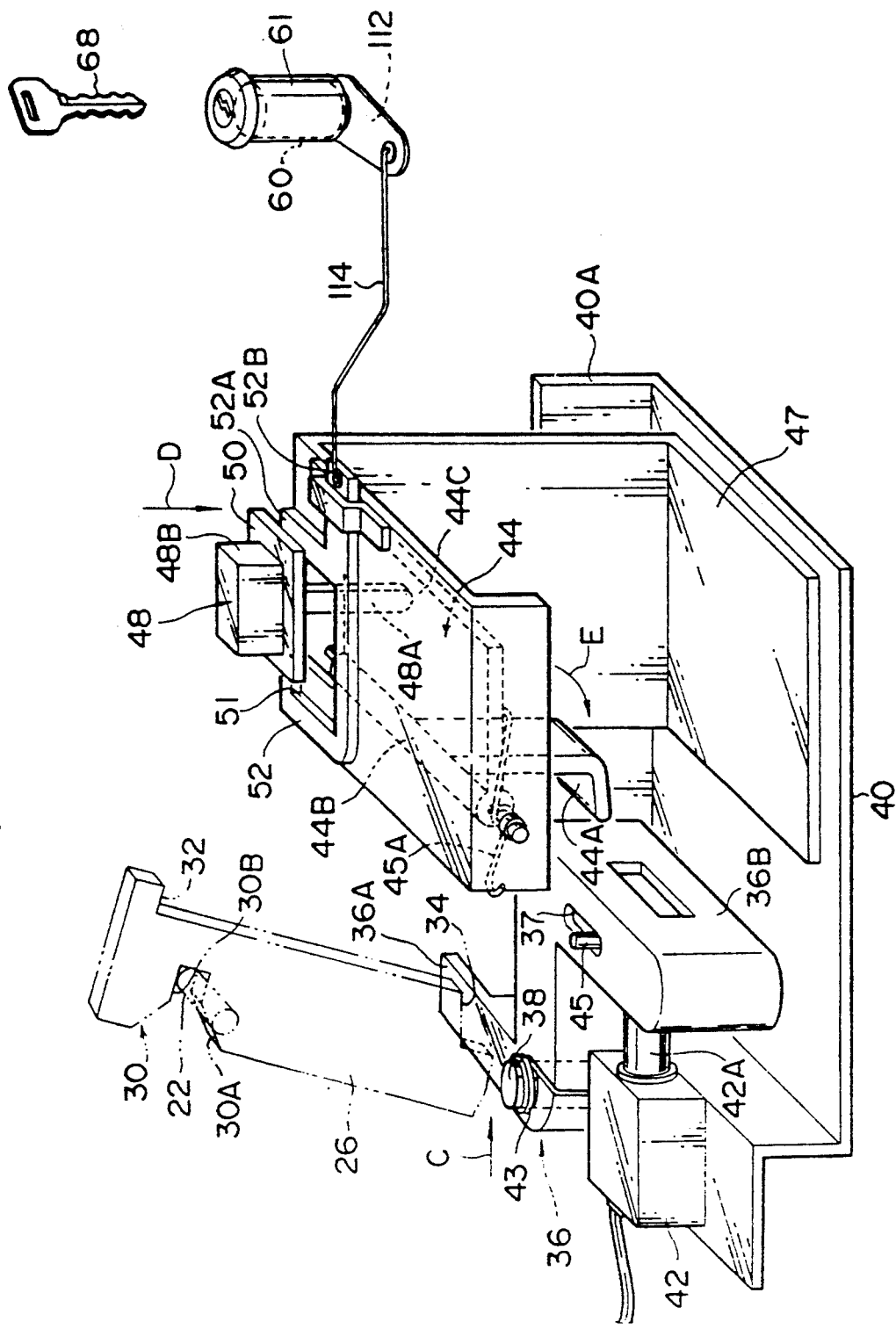
FIG. 9 is a perspective view of a shift locking apparat according to a fifth embodiment of the present invention.
Figure 10:
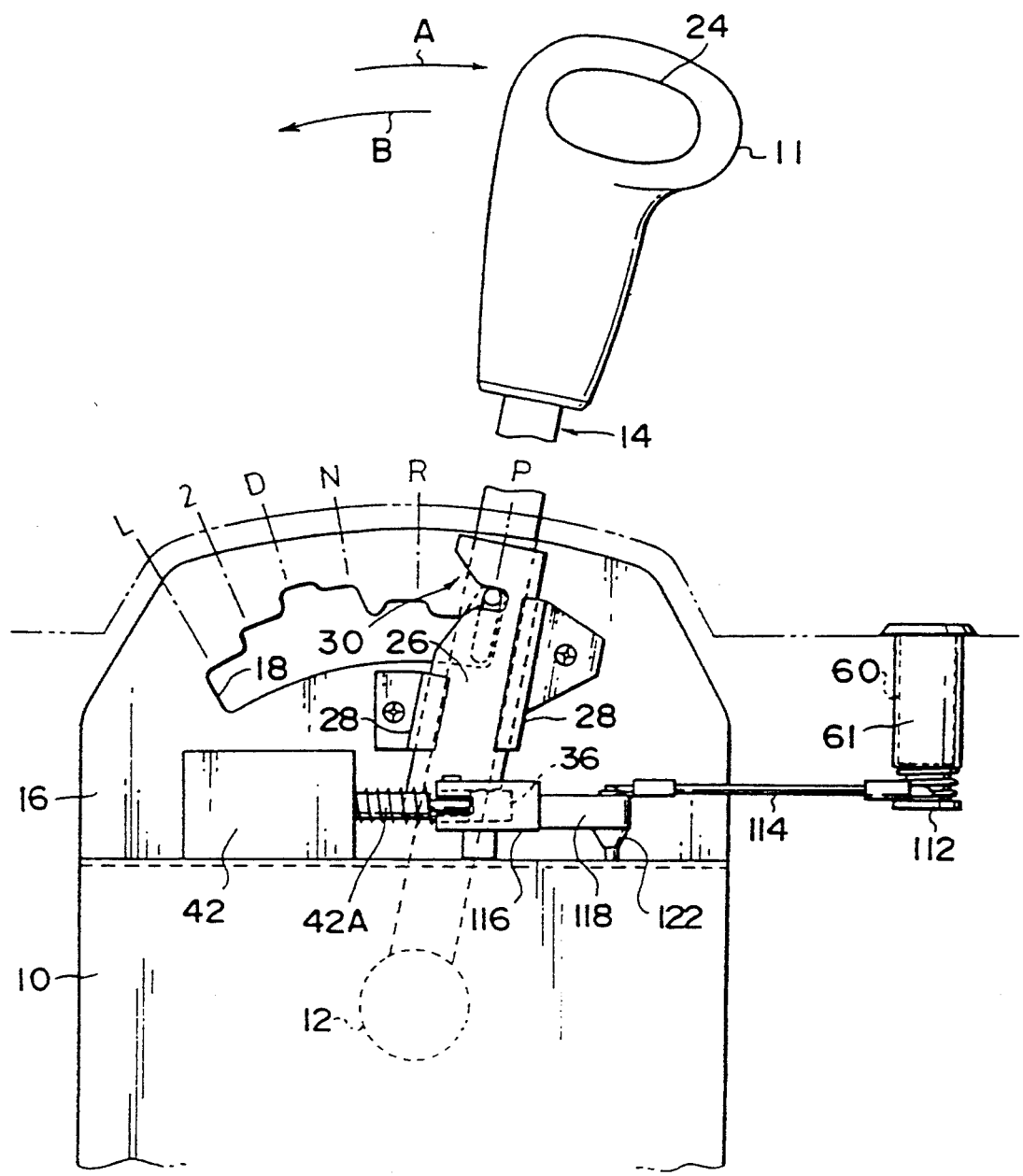
FIG. 10 is a side view of a shift locking apparatus according to a sixth embodiment of the present invention.
Figure 11:
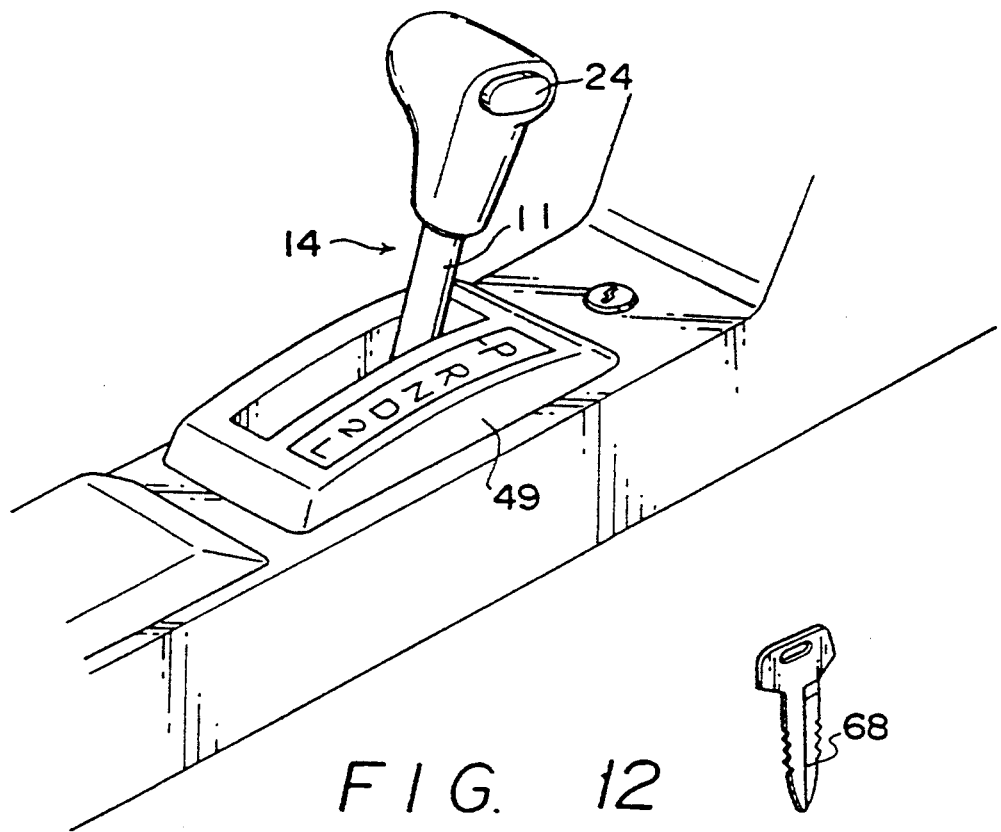
FIG. 11 is a perspective view illustrating portions in the vicinity of a shift lever to which the sixth embodiment is applied.
Figure 12:
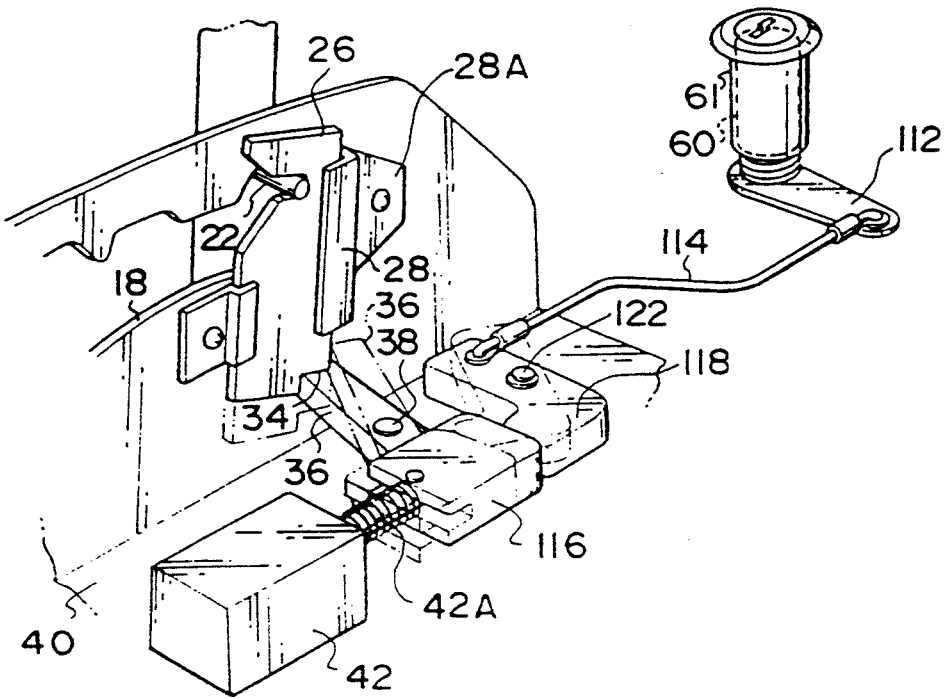
FIG. 12 is a perspective view of the shift locking apparatus shown in FIG. 10.

A fifth embodiment of the present invention is shown in FIG. 9. This embodiment is a modification of the first embodiment shown in FIG. 2 and is of a construction in which the key cylinder 61 is disposed in the vicinity of the shift lever 14. More specifically, the key cylinder 61 accommodating the key rotor 60 is mounted in the vicinity of the shift lever and preferably in the shift cover 49 adjacent the operating member 48. An arm 112 is secured to the key rotor 60. One end of the link 114 is axially supported to the arm 112. The other end of the link 114 is axially supported to the end 52B of the stopper 52.

If the key 68 is moved to a particular position by the insertion and rotation of the key 68, the link 114 permits the stopper 52 to be moved to a position which does not interfere with a moving path for the operating member 48.

It is preferable that the key cylinder 61 is mounted independently from a key cylinder for turning off a vehicle engine or the power supply source to a vehicle. This ensures that the operator can release the shift lock only by the special operations of withdrawing the key 68 from an engine-driving key cylinder, inserting it into the shift-lock releasing key cylinder, and rotating it.

A sixth embodiment of the present invention is shown in FIGS. 10 to 14.

In this embodiment, a combination of the key cylinder 61 and the link 114 described in the fifth embodiment is used. In addition, the plunger 42A receiving a pull-in force from the solenoid 42 is connected to a block 116, so that the lever plate 36 may be rotated about the support pin 38 by providing a rotative force to the lever plate 36 by the block 116. The end of the link 114 is axially supported to one end of an arm 118. An intermediate portion of the arm 118 is axially supported to the bracket 40 by a pin 122. The other end of the arm 118 is adapted to abut against the block 116.

Figure 13:
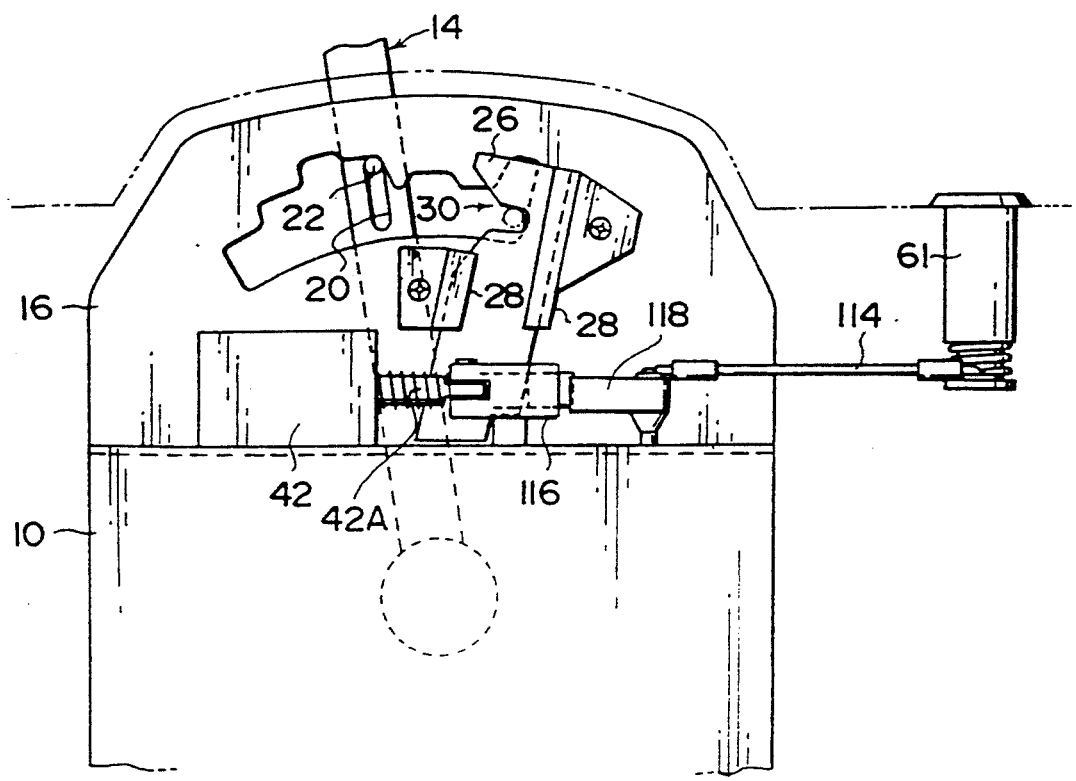
FIGS. 13 and 14 are side views illustrating the operation of the shift locking apparatus shown in FIG. 10.
Figure 14:
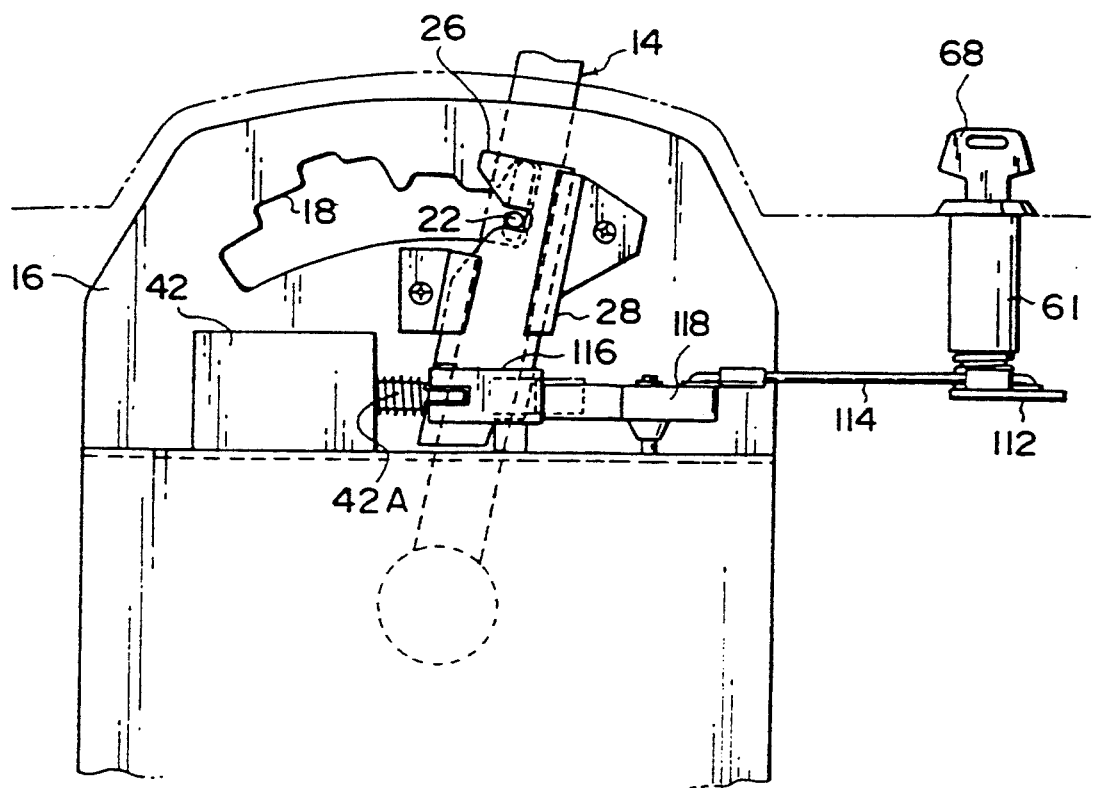
Figure 15:
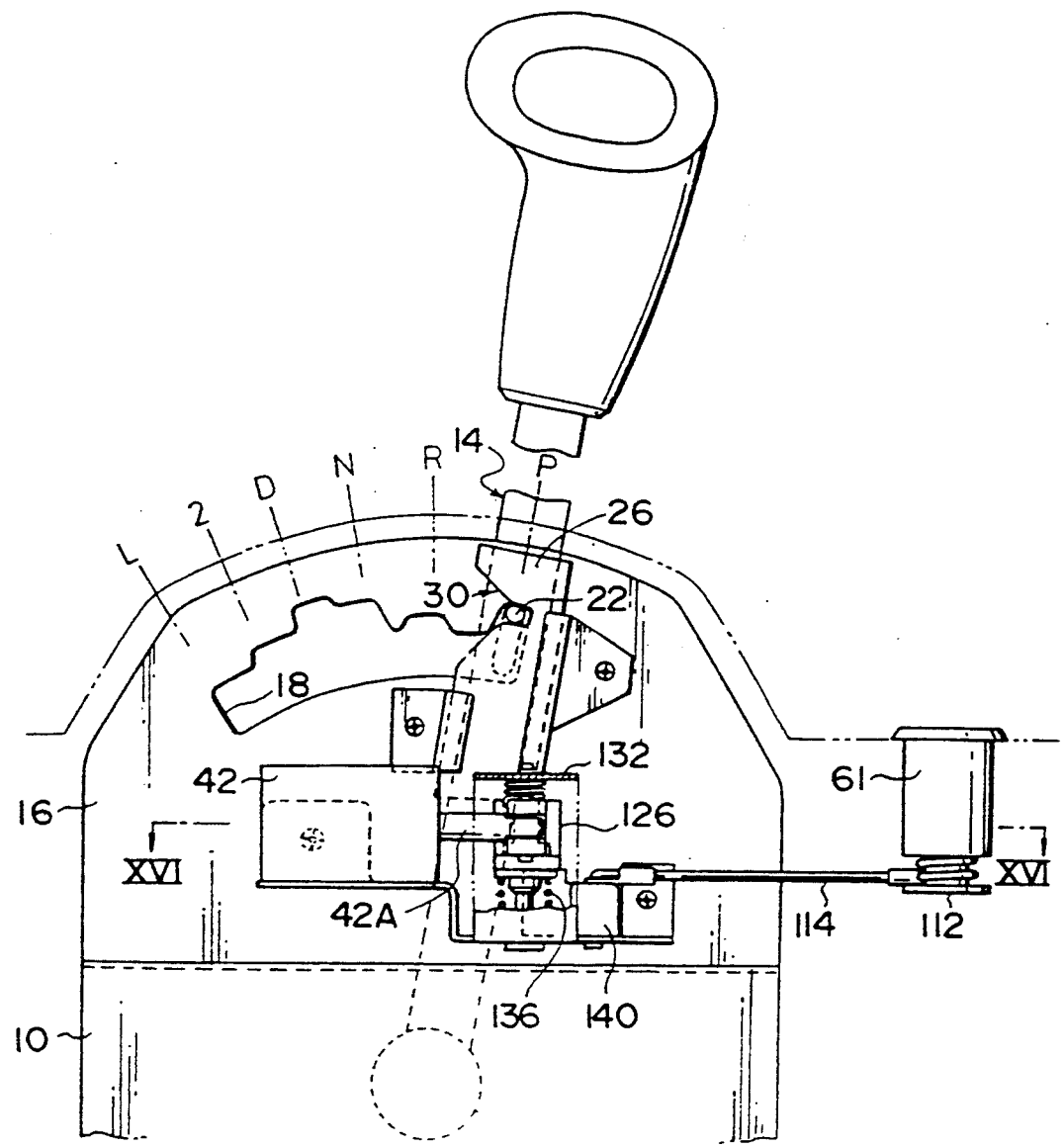
FIG. 15 is a side view of a shift locking apparatus according to a seventh embodiment of the present invention.
Figure 16:
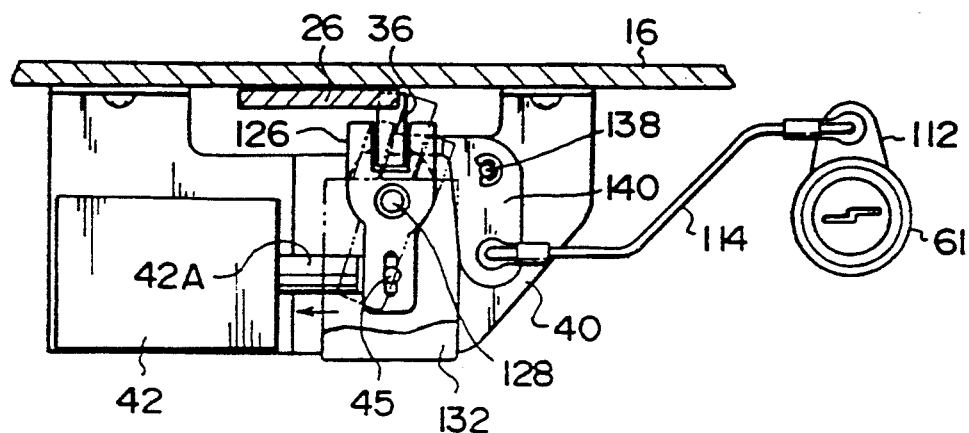
FIG. 16 is a sectional view taken along a line XVI—XVI in FIG. 15.
Figure 17A:
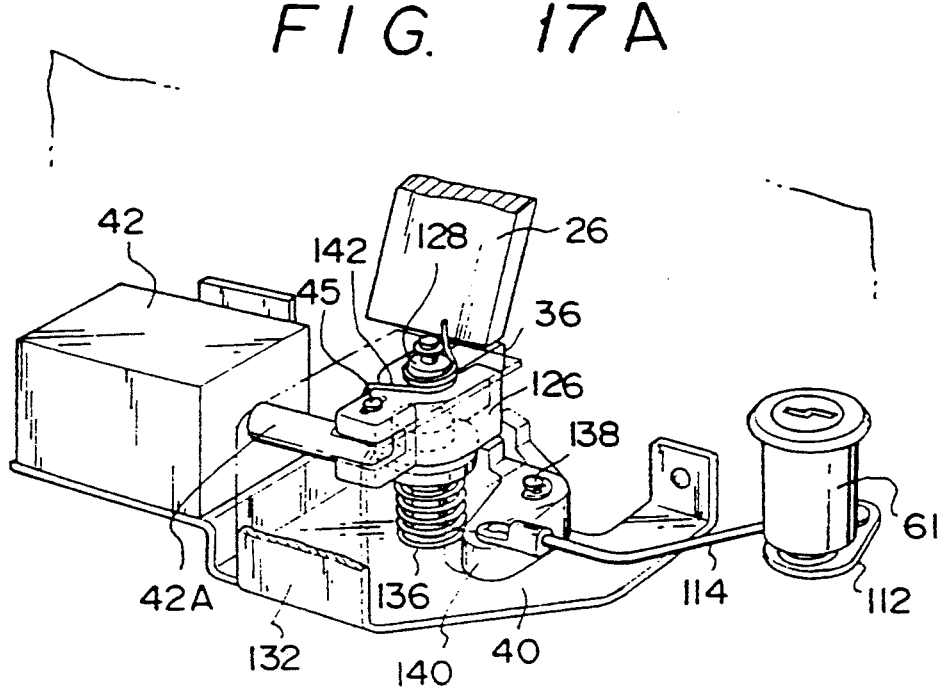
FIG. 17A is a perspective view of the shift locking apparatus shown in FIG. 16.
Figure 17B:
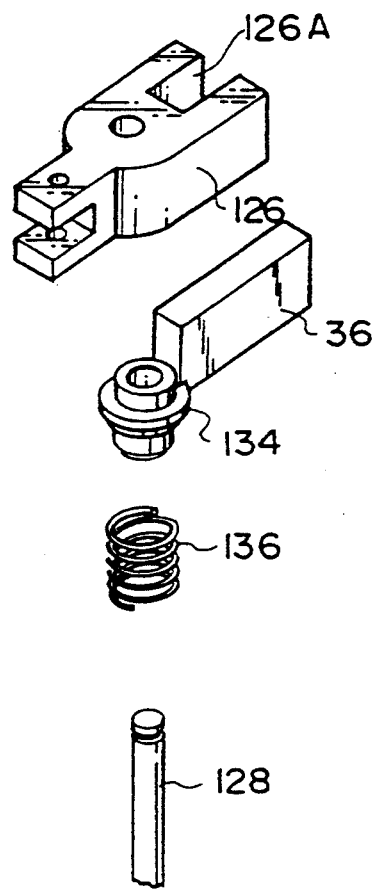
FIG. 17B is an exploded perspective view illustrating a portion of the shift locking apparatus of the seventh embodiment.

Thus, in this embodiment, if the solenoid 42 is energized, the plunger 42A moves the block 116 and hence, the lever plate 36 is slipped out of the lower notch 34 to release the locked state of the shift lever. Therefore, the shift lever 14 is movable to any shift position (FIG. 13). Even if the solenoid 42 is not energized, if the key 68 is inserted into the key cylinder 61 and rotated to a particular position, the link 114 rotates the arm 118 and hence, the arm 118 causes the block 116 to be pressed in the same manner as in the case where the solenoid 42 is operated, thereby rotating the lever plate 36 about support pin 38 to release the shift lock (see FIG. 14).

A seventh embodiment of the present invention is shown in FIGS. 15 to 19. In this embodiment, a rotating block 126 connected to the plunger 42A via a pin 45 is axially supported to a support post 128, as shown in FIGS. 17A and 17B. The support post 128 is axially supported at its lower end to the bracket 40 and at its upper end to an extension 132 which rises in an L-shape from the bracket 40. A disk 134 is axially supported to the support post 128 coaxially with the rotating block 126, and the lever plate 36 is secured to the disk 134. The lever plate 36 is adapted to be inserted into a notch 126A formed radially in the rotating block 126 by an urging force of a compression coil spring 136 interposed between the disk 134 and the bracket 40 and to be rotated about an axis of the support post 128 along with the rotating block 126. However, the lever plate 36 is movable downwardly towards the bracket 40 against the urging force of the compression coil spring 136. The lever plate 36 functions to prevent the lock plate 26 from being moved to the lock release position along with the detent pin by projecting its leading end from the notch 126A into a corresponding relation to the lower end of the lock plate 26. To this end, one end of the block 140 that axially supports the bracket 40 by a pin 138 enters between the lever plate 36 and the bracket 40 to block the downward movement of the lever plate 36. The link 114 is connected to the block 140, so that the block 140 receives a driving force of the key 68. The rotating block 126 is rotatably urged in the direction of projection of the plunger 42A from the solenoid 42 by a return spring 142 which may be a torsion coil spring.

Figure 18:
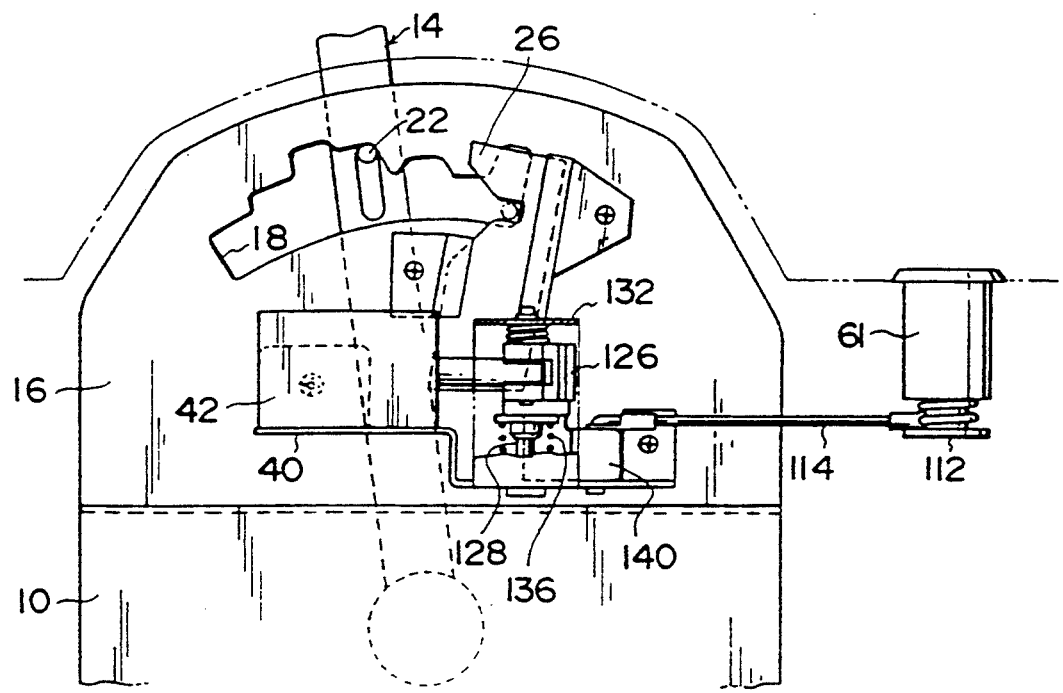
FIGS. 18 and 19 are views illustrating the operation of the shift locking apparatus shown in FIG. 15.

In an embodiment constructed in this manner, the lever plate 36 is disposed on the moving path of the lock plate 26. The lever plate 36 has the block 140 located at the opposite side from the lock plate 26 and hence, the lock plate 26 maintains the detent pin 22 in a locked state. If the solenoid 42 is energized by a special operation such as the depression of the foot brake by an operator, the solenoid 42 attracts the plunger 42A thereinto, so that the rotating block 126 is rotated about the support post 128 together with the lever plate 36, and the lever plate 36 is retracted from the moving path for the lock plate 26. This permits the lock plate 26 to move the detent pin 22 to a lock releasing position. Thus, the shift lever 14 can be moved to a desired shift position (FIG. 18).

Figure 19:
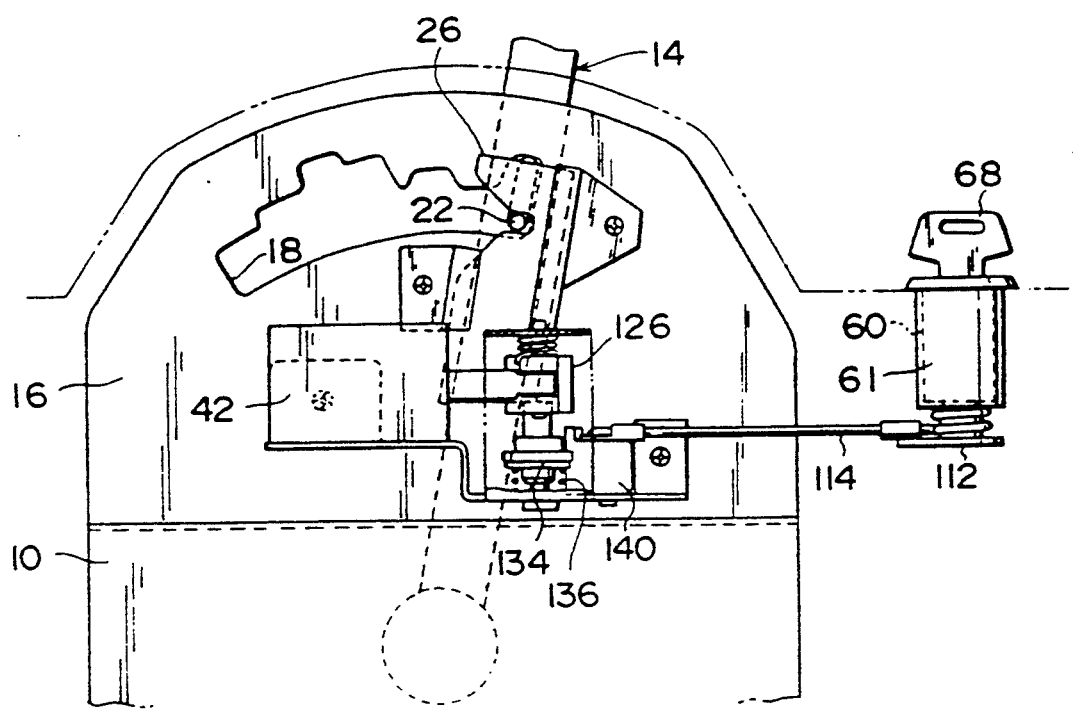

When the solenoid 42 is not energized, the lever plate 36 remains blocking the movement of the lock plate 26. If the operator now inserts the key 68 into the key cylinder 61 as shown in FIG. 19 and rotates the key rotor 60 to a selected position, the link 114 rotates the block 140 to a position that does not correspond to the lever plate 36. Therefore, if the operator depresses the detent releasing button 24 of the shift knob 11, the lock plate 26 can be moved in the axial direction of the support post 128 together with the lever plate 36 against the urging force of the compression coil spring 136, thereby releasing the shift lock.

An eighth embodiment of the present invention is shown in FIGS. 20 to 24.

In this embodiment, the solenoid 42 is secured to a rotating plate 146 which is axially supported to the detent plate 16 by a pin 148 disposed horizontally and is rotatable about the pin 148. The rotating plate 146 is provided with an elongated hole 150 having a center provided by the pin 148, and a pin 151 projecting from the detent plate 16 extends into the elongated hole 150. This ensures that the elongated hole 150 and the pin 151 cooperate to limit the rotational strokes of the rotating plate 146.

Figure 20:
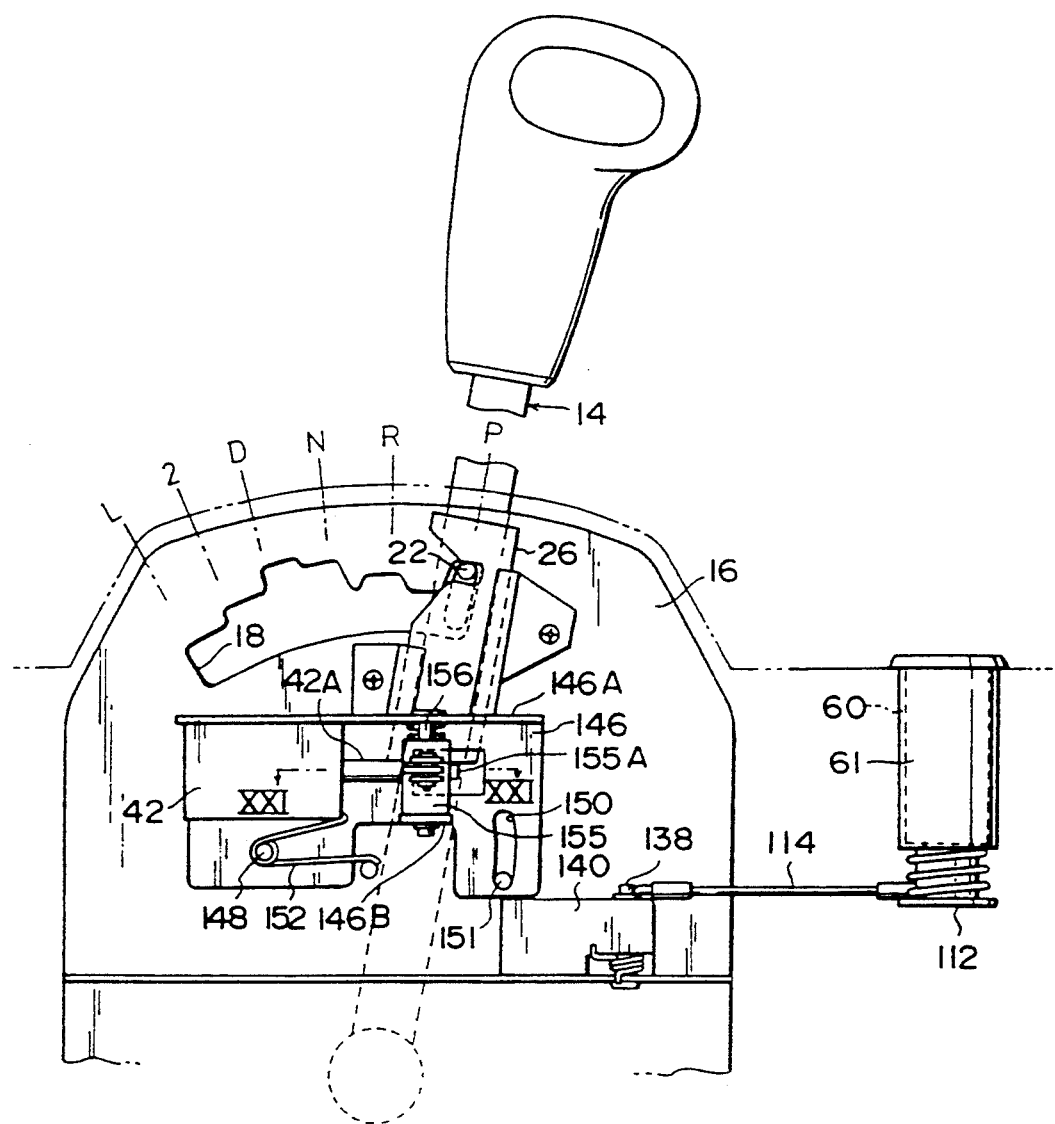
FIG. 20 is a side view of a shift locking apparatus according to an eighth embodiment of the present invention.

The rotating plate 146 is subjected to an urging force in a counterclockwise direction as viewed in FIG. 20 by a torsion coil spring 152.

Figure 21:
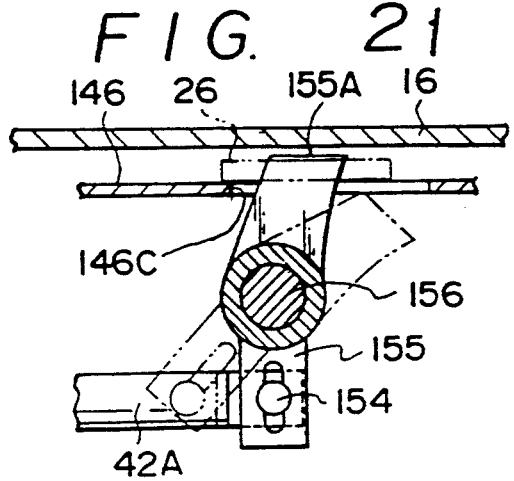
FIG. 21 is a sectional view taken along a line XXI—XXI in FIG. 10.
Figure 22:
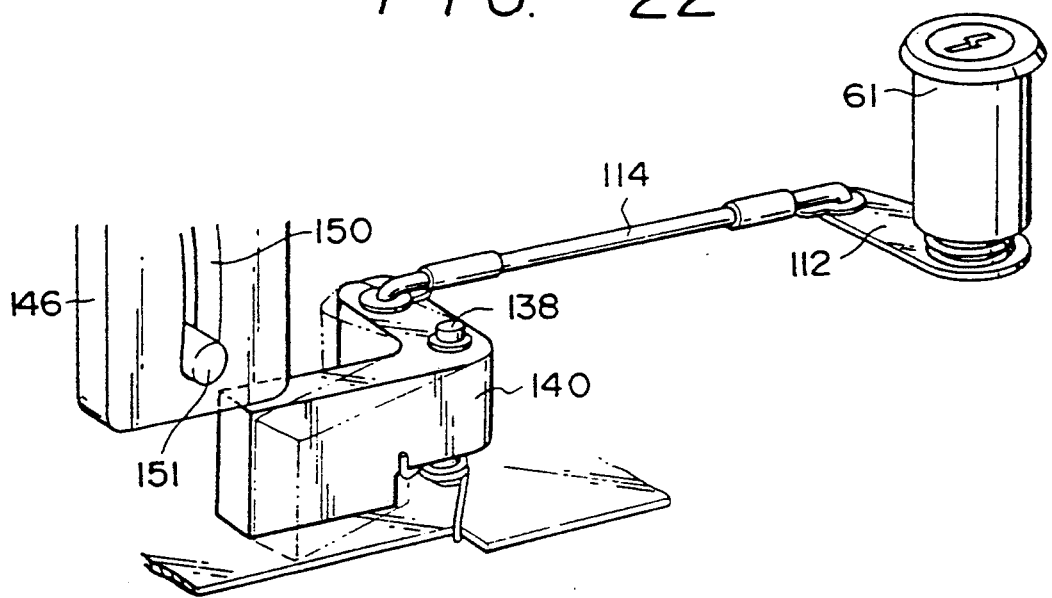
FIG. 22 is a perspective view illustrating a portion of the shift locking apparatus shown in FIG. 20.

An intermediate portion of a lever 155 connected to the plunger 42A by a pin 154 is axially supported to the rotating plate 146 by a pin 156 (see FIG. 21). The pin 156 is axially supported to the leg plates 146A and 146B integrally bent from upper and lower opposite ends of the rotating plate 146 in parallel to each other, as shown in FIG. 20. The lever 155 is disposed on a moving path of the lock plate 26 with its end 155A opposite from the pin 154 being passed through a notch 146C formed in the rotating plate 146.

Figure 24:
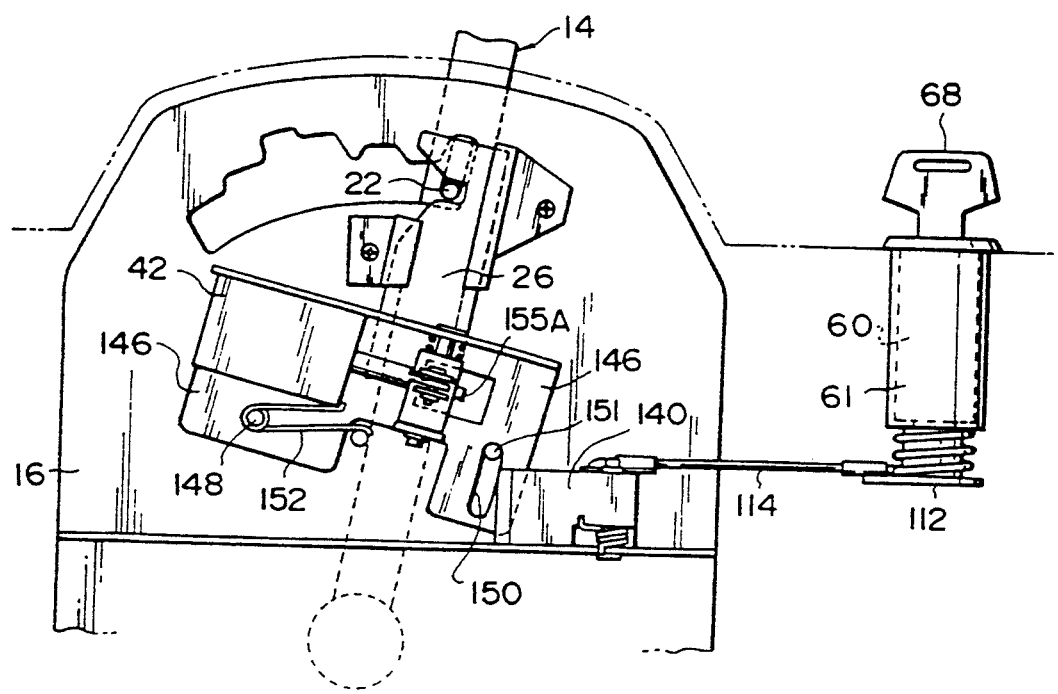

The rotating plate 146 is, as shown in FIG. 20, in a state in which the end 155A of the lever 155 blocks the movement of the lock plate 26 in the lock releasing direction. However, when the rotating plate 146 has been rotated in a clockwise direction about the pin 148 as shown in FIG. 24, the end 155A is retracted from the moving path of the lock plate 26, permitting the movement of the lock plate 26 and the detent pin 22 in the lock releasing direction.

In the state shown in FIG. 20, the block 140 corresponds to the rotating plate 146 to prevent the rotating movement of the rotating plate 146 about the pin 148. As in the previous embodiments, the arm 112 of the key rotor 60 is connected to the block 140 via the link 114.

Therefore, in this embodiment, the end 155A of the lever 155 retains the lock plate 26 and the detent pin 22 in their locked positions in the state shown in FIG. 20, because the block 140 prevents the rotation of the rotating plate 146 about the pin 148.

Figure 23:
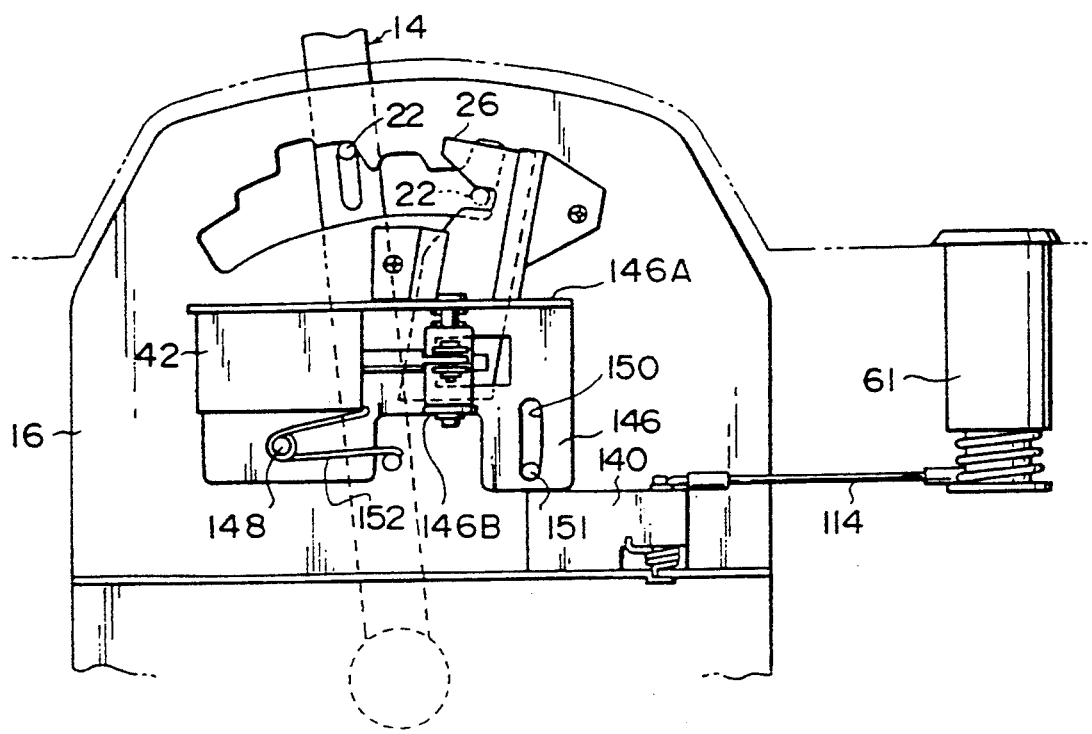
FIGS. 23 and 24 are views illustrating the operation of the shift locking apparatus shown in FIG. 20.

If the operator now performs a special operation such as the depression of the foot brake, the solenoid 42 is energized, so that the plunger 42A is attracted into the solenoid 42 by an excitation force. Therefore, the lever 155 is rotated in the clockwise direction as viewed in FIG. 21, causing the end 155A to be retracted from the moving path of the lock plate 26, so that the lock plate 26 and the detent pin 22 can be moved to their lock releasing positions. This ensures that the shift lever 14 can be moved to any shift position with the detent pin 22 urged down, as shown in FIG. 23.

When the solenoid 42 cannot be operated due to trouble or the like, the block 140 can be retracted from the moving path of the rotating plate 146 by inserting the key 68 into the key cylinder 61 by the occupant to rotate the key rotor 60 to a selected position as shown in FIG. 24. Therefore, the rotating plate 146 can be rotated about the pin 148 to release the shift lock.

It should be noted that in this embodiment and the previous embodiments, that if the shift lock can be released even when the plunger 42A cannot be inserted into the solenoid 42.

In each of the above-described embodiments, the solenoid may be of another construction such as a construction where the plunger can be retained by an excitation force in two positions: a position in which the plunger is attracted into solenoid and a position in which the plunger is not attracted into the solenoid. In addition, an electrical driving means such as a motor may be also employed in place of the solenoid.

What is claimed is:

1. A locking apparatus for an electrically operated shift lever of an automatic transmission, in which shifting of the shift lever is locked in a specified shift position, and the locking of the shift lever is released by a predetermined operation of an operator, comprising:

(a) a detent pin adapted to be moved to a lock releasing position from a lock position by the operator when the shift lever is shifted from said specified shift position to another shift position;

(b) an electrically operated actuator for retaining said detent pin in said lock position and for withdrawing said detent pin to said lock releasing position upon said predetermined operation of said operator; and (c) a shift lock releasing means including a key for withdrawing said detent pin from said lock position by said electrically operated actuator, when said key is operated in a specified position by the operator, such that said detent pin can be moved to said lock releasing position even when electric power is not available to operate said actuator, thereby permitting the shifting of the shift lever, wherein said shift lock releasing means includes a manual operating means for releasing said detent pin from the lock position by the operation of the operator and a key cylinder interlocking means which permits movement of said manual operating means by inserting key and operating it to a specified position, said key cylinder interlocking means adapted to permit the movement of said manual operation means by pushing-in the key after operation thereof to said specified position.

2. A locking apparatus for a shift lever according to claim 1, wherein said electrically operated actuator includes an electrical driving means for moving said lock retaining means during energization, and said electrically operated actuator is operatively connected to said lock retaining means.

3. A locking apparatus for a shift lever according to claim 1, wherein said shift lock releasing means includes a cable connected to said key and said lock retaining means to release said detent pin from said lock position by forcefully moving said lock retaining means.

4. A locking apparatus for a shift lever according to claim 2, wherein said shift lock releasing means is adapted to release said detent pin from said lock position by rotation of the key by the operator, while maintaining a connected state of said lock retaining means and said electrical driving means.

* * * * *